US009584525B2

United States Patent
Baikalov et al.

(10) Patent No.: US 9,584,525 B2
(45) Date of Patent: *Feb. 28, 2017

(54) ENTITLEMENT PREDICTIONS

(71) Applicant: Bank of America Corporation, Charlotte, NC (US)

(72) Inventors: Igor A. Baikalov, Thousand Oaks, CA (US); Randy Jia, Rochester Hills, MI (US)

(73) Assignee: Bank of America Corporation, Charlotte, NC (US)

( * ) Notice: Subject to any disclaimer, the term of this patent is extended or adjusted under 35 U.S.C. 154(b) by 7 days.

This patent is subject to a terminal disclaimer.

(21) Appl. No.: 14/840,440

(22) Filed: Aug. 31, 2015

(65) Prior Publication Data

US 2015/0373028 A1    Dec. 24, 2015

Related U.S. Application Data

(63) Continuation of application No. 14/013,562, filed on Aug. 29, 2013, now Pat. No. 9,147,055.

(51) Int. Cl.

| | |
|---|---|
| *G06F 21/00* | (2013.01) |
| *G06F 21/31* | (2013.01) |
| *G06F 21/44* | (2013.01) |
| *G06F 21/62* | (2013.01) |
| *H04L 29/06* | (2006.01) |

(Continued)

(52) U.S. Cl.
CPC ............ *H04L 63/102* (2013.01); *G06F 21/31* (2013.01); *G06F 21/577* (2013.01); *G06F 21/604* (2013.01)

(58) Field of Classification Search
CPC ... H04L 9/3247; H04L 2209/60; H04L 29/06; H04L 63/08; H04L 63/10; H04L 63/20; H04L 63/102; G06F 17/30002; G06F 2221/2111; G06F 21/00; G06F 21/08; G06F 21/10; G06F 21/20; G06F 21/31;
(Continued)

(56) References Cited

U.S. PATENT DOCUMENTS

| | | | |
|---|---|---|---|
| 8,196,195 B2 | 6/2012 | Bartley et al. | |
| 8,230,434 B2 | 7/2012 | Armstrong et al. | |

(Continued)

OTHER PUBLICATIONS

Khider et al., "Attribute-Based Attribute Authorization for Grid Computing", 2010 IEEE.

*Primary Examiner* — Joseph P Hirl
*Assistant Examiner* — Kalish Bell
(74) *Attorney, Agent, or Firm* — Banner & Witcoff, Ltd.; Michael A. Springs

(57) ABSTRACT

Systems, methods, and devices for predicting entitlements to computing resources are described. An entitlement associated with a user of a computer system may be identified. The entitlement may indicate a computing resource of the computer system that is accessible to the user. A set of attributes associated with the user may be selected, and an entitlement probability value may be obtained. The entitlement probability value may be based on the set of attributes and indicate a probability that the user is authorized to have the entitlement. The entitlement probability value may be used to determine whether to include the entitlement in an access review. Depending on the entitlement probability value the entitlement may be included in the access review or excluded from the access review.

20 Claims, 11 Drawing Sheets

(51) Int. Cl.
*G06F 21/57* (2013.01)
*G06F 21/60* (2013.01)

(58) Field of Classification Search
CPC .... G06F 21/62; G06F 21/604; G06F 21/6218; G06F 21/6227
USPC ........ 726/1–4, 11, 12, 14, 16, 17, 21, 27–29
See application file for complete search history.

(56) References Cited

U.S. PATENT DOCUMENTS

| | | | |
|---|---|---|---|
| 8,458,337 | B2 | 6/2013 | Corley et al. |
| 8,533,168 | B2 | 9/2013 | Kuehr-McLaren et al. |
| 8,543,607 | B2 | 9/2013 | Sreedhar |
| 8,635,689 | B2 | 1/2014 | Hernandez et al. |
| 8,645,843 | B2 | 2/2014 | Chee et al. |
| 8,700,581 | B2 | 4/2014 | Paknad et al. |
| 8,706,692 | B1 | 4/2014 | Luthra et al. |
| 2005/0015621 | A1 | 1/2005 | Ashley et al. |
| 2007/0174249 | A1 | 7/2007 | James |
| 2008/0086473 | A1 | 4/2008 | Searl et al. |
| 2008/0184336 | A1 | 7/2008 | Sarukkai et al. |
| 2008/0195586 | A1 | 8/2008 | Arnold et al. |
| 2009/0187440 | A1 | 7/2009 | Sreevas et al. |
| 2012/0046989 | A1 | 2/2012 | Baikalov et al. |
| 2012/0047575 | A1* | 2/2012 | Baikalov ............... G06F 21/577 726/21 |
| 2012/0083700 | A1* | 4/2012 | Osorio ................. A61B 5/0245 600/483 |
| 2013/0198639 | A1 | 8/2013 | Casco-Arias Sanchez et al. |
| 2013/0227638 | A1 | 8/2013 | Giambiagi et al. |
| 2013/0254866 | A1 | 9/2013 | Koster et al. |
| 2013/0283356 | A1 | 10/2013 | Mardikar et al. |
| 2013/0298202 | A1 | 11/2013 | Warshavsky et al. |
| 2013/0312084 | A1 | 11/2013 | Tandon |
| 2013/0332984 | A1 | 12/2013 | Sastry et al. |
| 2014/0075492 | A1 | 3/2014 | Kapadia et al. |
| 2014/0109168 | A1 | 4/2014 | Ashley et al. |

\* cited by examiner

ENTITLEMENT PREDICTIONS

CROSS-REFERENCE TO RELATED APPLICATION

This application is a continuation of U.S. patent application Ser. No. 14/013,562 entitled "Entitlement Predictions" and filed on Aug. 29, 2013 which is incorporated by reference herein in its entirety.

TECHNICAL FIELD

Aspects of the present disclosure generally relate to entitlements to computing resources and particularly related to predicting whether a user is authorized to have a particular entitlement.

BACKGROUND

Enterprises may maintain large computer systems to facilitate and support their endeavors. Individuals of such enterprises may utilize these computer systems to perform various activities or job functions. A principle of information security management holds that individuals should only be authorized to access computing resources necessary to carry out their assigned job functions. Accordingly, another principle of information security may recommend periodic access reviews to verify that individuals only capable of accessing computing resources those individuals are authorized to access.

If an access review reveals that an individual is capable of accessing a computing resource that the individual is not authorized to access, such access may be revoked for that individual. In this way, the security of the computing systems and its resources are maintained. One or more individuals of the enterprise may be responsible for conducting the access reviews, e.g., a manager. Large enterprises, however, may include thousands of individuals, and each individual may be associated with dozens—if not hundreds—of entitlements. For managers that manage multiple individuals, conducting access reviews for those individuals can be a challenge. For example, a manager that manages a dozen individuals each having an average of a hundred entitlements may be tasked with reviewing over a thousand entitlements during access reviews for those individuals. Such an endeavor is not only time-consuming, access reviews for so many entitlements may limit the ability of a manager to perform other managerial duties.

Therefore, a need exists for an improved approach to conducting access reviews that reduces the number of entitlements requiring review by a manager without negatively impacting the access risk to an enterprise.

BRIEF SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

A first aspect described herein provides a computer-implemented method of predicting entitlements to computing resources. An entitlement associated with a user of a computer system may be identified. The entitlement may indicate a computing resource of the computer system that is accessible to the user. A set of attributes associated with the user may be selected, and an entitlement probability value may be obtained. The entitlement probability value may be based on the set of attributes and indicate a probability that the user is authorized to have the entitlement. The entitlement probability value may be used to determine whether to include the entitlement in an access review. Depending on the entitlement probability value the entitlement may be included in the access review or excluded from the access review.

A second aspect described herein provides a system for predicting entitlements to a computing resource. The system may include at least one processor, an attribute database, and an entitlement database. The attribute database may store attribute information identifying one or more attributes associated with a user of a computing system. The entitlement database may store entitlement information identifying an entitlement that indicates a computing resource of the computer system that is accessible to the user. A specificity determination module may, in operation, obtain a specificity value for the attribute with respect to the entitlement. A sensitivity determination module may, in operation, obtain a sensitivity value for the attribute with respect to the entitlement. An affinity determination module may obtain an affinity value for the attribute based on the specificity value and the sensitivity value. A probability determination module may, in operation, obtain a partial probability value for an attribute value of an attribute associated with the user. The probability determination module may, in operation, also obtain an entitlement probability value based, at least in part, on the affinity value and the partial probability value.

A third aspect described herein provides non-transitory computer-readable media for predicting entitlements to computing resources. As used in this description non-transitory computer-readable media includes all computer-readable media with the sole exception being a transitory, propagating signal. When executed, the instructions may cause a computing device to identify an entitlement associated with a user of a computer system. The entitlement may indicate a computing resource of the computer system that is accessible to the user. The computing device may obtain an entitlement probability value based on the set of attributes associated with the user. The entitlement probability value indicates a probability the user is authorized to have the entitlement. The computing device may compare the entitlement probability to a predetermined probability threshold. When the entitlement probability value is less than the probability threshold, the computing device may cause the entitlement to be included in an access review. When the entitlement probability value is greater than or equal to the probability threshold, the computing device may cause the entitlement to be excluded from the access review.

These and additional aspects will be appreciated with the benefit of the detailed description provided below.

BRIEF DESCRIPTION OF THE DRAWINGS

Aspects of the disclosure may be implemented in certain parts, steps, and embodiments that will be described in detail in the following description and illustrated in the accompanying drawings in which like reference numerals indicate similar elements. It will be appreciated with the benefit of this disclosure that the steps illustrated in the accompanying figures may be performed in other than the recited order and that one or more of the steps disclosed may be optional. It will also be appreciated with the benefit of this disclosure that one or more components illustrated in the accompanying figures may be positioned in other than the disclosed arrangement and that one or more of the components illustrated may be optional.

DETAILED DESCRIPTION

Figure 1:
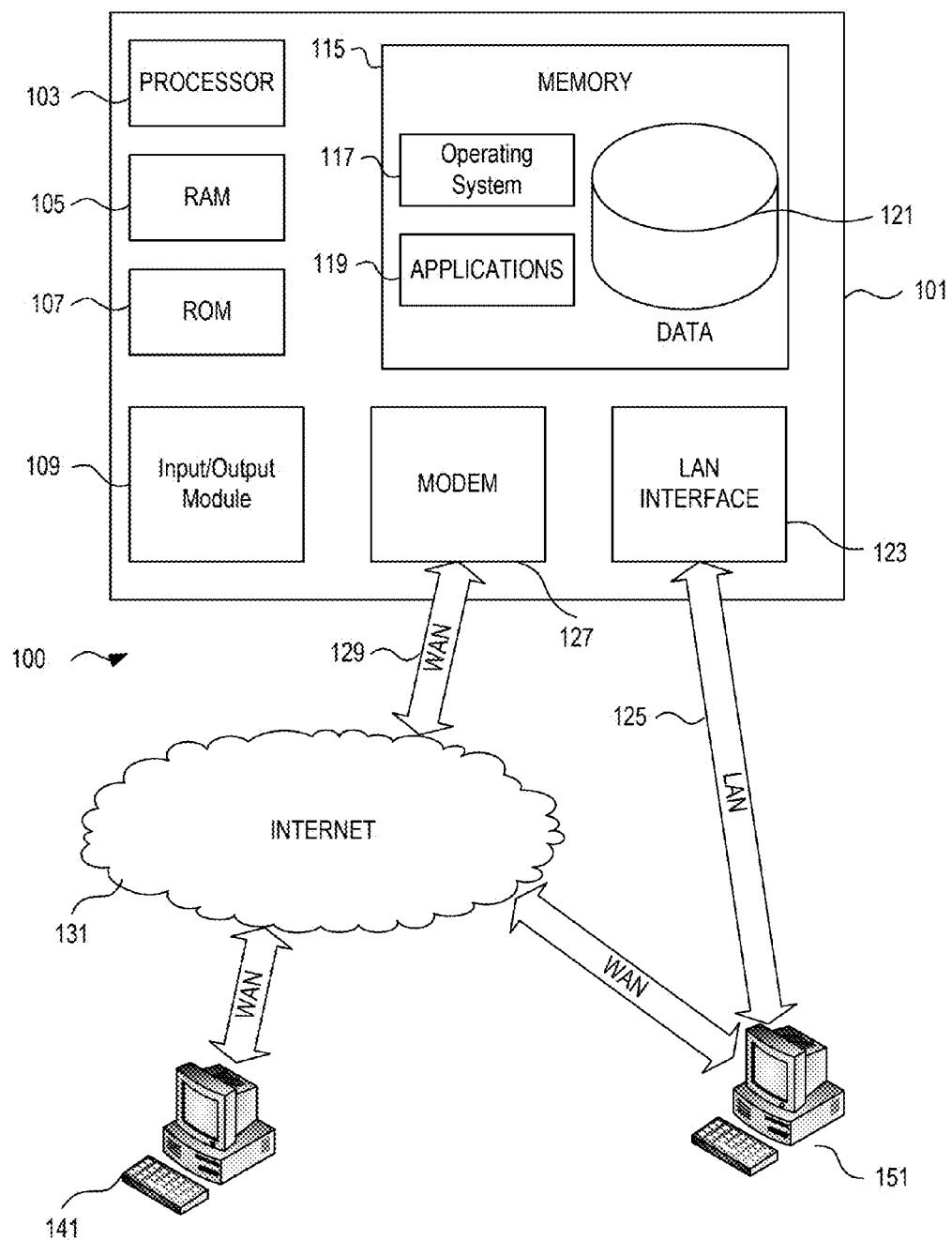
FIG. 1 is a block diagram of an example operating environment in which various aspects of the disclosure may be implemented.

Aspects described herein provide improved approaches to conducting access reviews of entitlements assigned to individuals of an enterprise. More particularly, the approaches described herein predict whether or not a user is authorized to have an entitlement based on attributes of the user. If an individual is predicted to be authorized to have an entitlement, then that entitlement may be excluded from an access review thereby reducing the number of entitlements that must be reviewed by a manager. In this way, entitlements a user is predicted to be authorized for may be advantageously removed from the scope of the access reviews. Stated differently, the approaches described in detail below may automate a portion of an access review by predicting with a high degree of confidence whether or not an individual is authorized for a particular entitlement such that entitlements the user is predicted to be authorized for need not be manually reviewed.

The approaches set forth below provide numerous advantages. An enterprise may employ the approaches described in order to reduce the number of entitlements requiring manual review. As a result, the accuracy of the access reviews may be improved. Managers of the enterprise may focus more on entitlements requiring manual review thereby reducing the likelihood that a manager may overlook entitlements and, in turn, reducing the access risk to the enterprise. Another advantage permits automatic provisioning of multiple entitlements for new or existing users. An enterprise may employ the approaches described to identify entitlements for which users having a particular set of attributes are likely to be authorized for. In turn, the enterprise may create attribute-based user roles and assign those entitlements to the attribute-based user roles. Multiple entitlements may thus be assigned to a user by requesting a single attribute-based user role for the user rather than individually requesting each entitlement for the user. As a result, the time spent assigning entitlements to a user and the time spent waiting for corresponding access credentials is advantageously reduced.

To facilitate the description below, the following terminology is adopted. An enterprise refers to an organization such as a business or other collection of individuals associated with one another for a common purpose. An individual refers to a person associated with an enterprise in some respect, e.g., as a member of the enterprise, an employee of the enterprise, a contractor of the enterprise, and so forth. When an individual utilizes a computing resource of the enterprise, the individual may be referred to as a user.

An enterprise may maintain multiple computing resources ("resource"). A resource refers to a computer system—including the hardware and software components that make up a computer system—as well as a network of computer systems. Resources include information systems, applications, services, programs, computing devices (e.g. servers, PCs), network devices (e.g. switches and routers, networks, files, file systems, databases and database objects (e.g. tables, views, and stored procedures).

A user may be assigned an entitlement indicating a resource the user is entitled to access and defining a set of permissions regarding such access. Accordingly, an entitlement refers to an association between a user, a resource, and a permission. A permission refers to a set of access rights (e.g., read, write, execute) the user may perform on the resource. Furthermore, a user may be said to have an entitlement or be assigned an entitlement when an association exists between a user account, a resource, and a permission. It will be appreciated that even though a user has an entitlement, the user may not be able to access the resource until the entitlement is physically provisioned for the user account at the computer system, e.g., by establishing access credentials such as a username and password for the entitlement. As described in detail below, the various approaches provided predict whether a user is authorized for an entitlement assigned to the user.

A user may also be associated with multiple attributes. An attribute refers to some characteristic of a user. Attributes may relate to personal characteristics of the user, professional characteristics of the user, and other types of characteristics associated with the user. Example user attributes may include a job code for the user regarding the position of the user within the enterprise ("job code"), a geographical location of the user ("location"), the name or unique identifier of a manager that manages the user ("manager"), and other types of attributes. One or more unique values may be set for an attribute. The value of a particular attribute may be referred to as the attribute value. Examples of attribute values for a location attribute may include "North America," "Europe," and "Asia." The approaches described in further detail below predict whether user is authorized to have an entitlement based on one or more attributes of the user.

An entitlement prediction refers to the likelihood that a user with a particular set of attributes is authorized to have an entitlement. The entitlement prediction may be quantified as an entitlement probability value. In some example implementations, the entitlement probability value may range between zero and one. The larger the probability value, the more likely a user with the particular set of attributes is authorized to have the entitlement. The entitlement probability value may be determined based on a set of partial probability values and a set of affinity values. Partial probability refers to the likelihood that a user with one particular attribute value also has an entitlement. Accordingly, partial probability for an attribute value may be based on the population of users with a particular attribute value that also have the entitlement and on the overall population of users having that attribute value. Partial probability will be discussed in further detail below.

Affinity refers to the dependency between an entitlement and an attribute, in other words, whether or not having an entitlement depends on having a particular attribute value. Affinity may be quantified as an affinity value, and, in some example embodiments, the affinity value may range between zero and one. The affinity value for an attribute-entitlement pair may be based on the specificity and the sensitivity of an attribute-entitlement pair, which, in some example embodiment, may also range between zero and one. Specificity refers to the total number of unique attribute values for an attribute with respect to the number of unique attribute values represented by the population having the entitlement. Sensitivity refers to the total number of users across attributes values having at least one user with the entitlement with respect to the total number of users with the entitlement across those attribute values. Specificity and sensitivity may also be quantified as a specificity value and a sensitivity value respectively. Affinity, specificity, and sensitivity will be discussed in further detail below.

Furthermore, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging. In addition, "set" as used in this description refers to a collection that may include one element or more than one element. Moreover, aspects of the disclosure may be implemented in non-transitory computer-readable media having instructions stored thereon that, when executed by a processor, cause the processor to perform various steps described in further detail below. As used in this description, non-transitory computer-readable media refers to all computer-readable media with the sole exception being a transitory propagating signal.

FIG. 1 illustrates a block diagram of at least a portion of an IAM system 101 (e.g., a computer server) in communication system 100 that may be used according to an illustrative embodiment of the disclosure. The system 101 may have a processor 103 for controlling overall operation of the system and its associated components, including RAM 105, ROM 107, input/output (I/O) module 109, and memory 115.

I/O 109 may include a microphone, keypad, touch screen, and/or stylus through which a user of the IAM system 101 may provide input, and may also include one or more of a speaker for providing audio output and a video display device for providing textual, audiovisual and/or graphical output. Software may be stored within memory 115 and/or storage to provide instructions to processor 103 for enabling the system 101 to perform various functions. For example, memory 115 may store software used by the system 101, such as an operating system 117, application programs 119, and an associated database 121. Processor 103 and its associated components may allow the system 101 to run a series of computer-readable instructions to process and respond to access requests and to facilitate access reviews.

The system 101 may operate in a networked environment supporting connections to one or more remote computers, such as terminals 141 and 151. The terminals 141 and 151 may be personal computers or servers that include many or all of the elements described above relative to the system 101. Alternatively, terminal 141 and/or 151 may be a data store that is affected by the backup and retention policies stored on the system 101. The network connections depicted in FIG. 1 include a local area network (LAN) 125 and a wide area network (WAN) 129, but may also include other networks. When used in a LAN networking environment, the system 101 is connected to the LAN 125 through a network interface or adapter 123. When used in a WAN networking environment, the system 101 may include a modem 127 or other means for establishing communications over the WAN 129, such as the Internet 131. It will be appreciated that the network connections shown are illustrative and other means of establishing a communications link between the computers may be used. The existence of any of various well-known protocols such as TCP/IP, Ethernet, FTP, HTTP and the like is presumed.

Additionally, one or more application programs 119 used by the IAM system 101 according to an illustrative embodiment of the disclosure may include computer executable instructions for invoking functionality related to processing and responding to access requests and to facilitating access reviews.

The transaction analysis system 101 and/or terminals 141 or 151 may also be mobile terminals, such as smart phones, personal digital assistants (PDAs), and the like. including various other components, such as a battery, speaker, and antennas (not shown).

The disclosure is operational with numerous other general purpose or special purpose computing system environments or configurations. Examples of well-known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, and distributed computing environments that include any of the above systems or devices, and the like.

The disclosure may be described in the general context of computer-executable instructions, such as program modules, being executed by a computer. Generally, program modules include routines, programs, objects, components, data structures, and the like that perform particular tasks or implement particular abstract data types. The disclosure may also be practiced in distributed computing environments where tasks are performed by remote processing devices that are linked, for example, through a communications network. In a distributed computing environment, program modules may be located in both local and remote computer storage media including memory storage devices.

Figure 2:
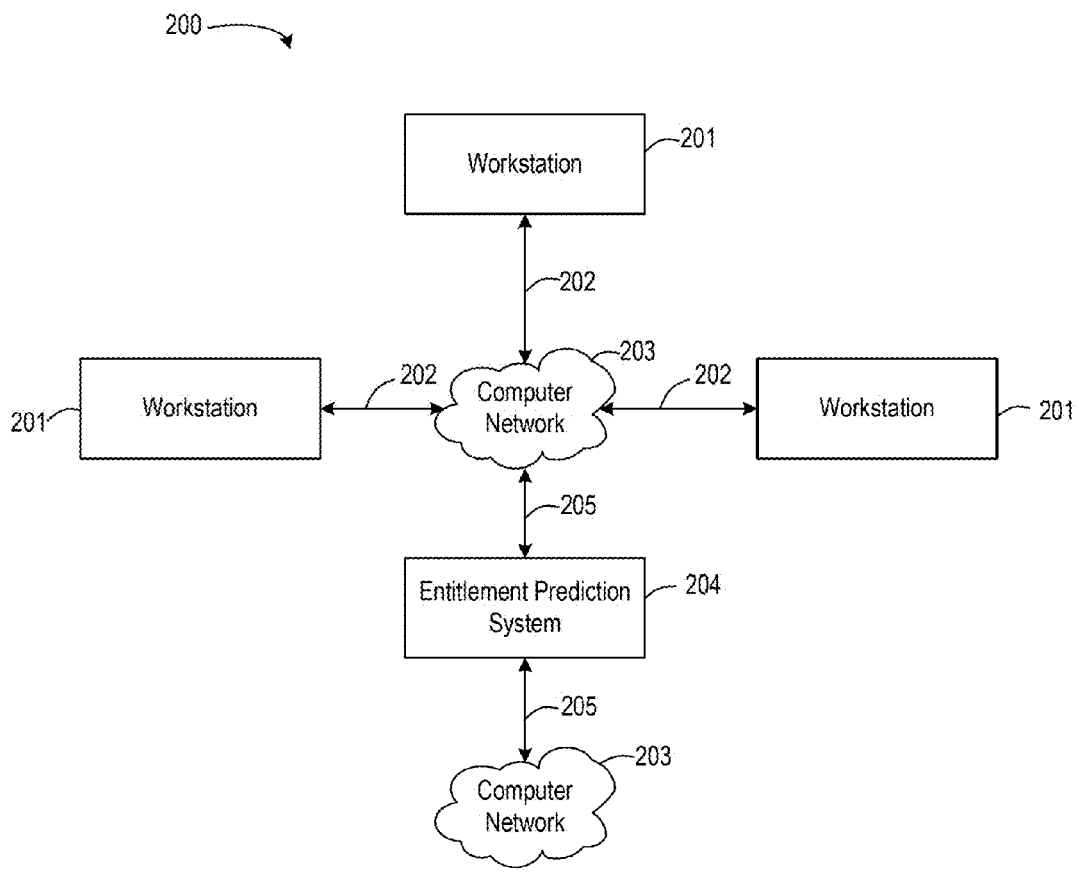
FIG. 2 is a block diagram of example workstations and servers that may be used to implement the processes and functions of one or more aspects of the present disclosure.

Referring to FIG. 2, an illustrative system 200 for implementing methods according to the present disclosure is shown. As illustrated, system 200 may include one or more workstations/servers 201. Workstations 201 may be local or remote, and are connected by one or more communications links 202 to computer network 203 that is linked via communications links 205 to the IAM system 204. In certain embodiments, workstations 201 may be different servers that communicate with the IAM system 204, or, in other embodiments, workstations 201 may be different points at which the IAM system 204 may be accessed. In system 200, the IAM system 204 may be any suitable server, processor, computer, or data processing device, or combination of the same.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and the transaction analysis system 204, such as network links, dial-up links, wireless links, hard-wired links, and the like.

The disclosure that follows in the figures may be implemented by one or more of the components in FIG. 1 and FIG. 2 and/or other components, including other computing devices.

Figure 3:
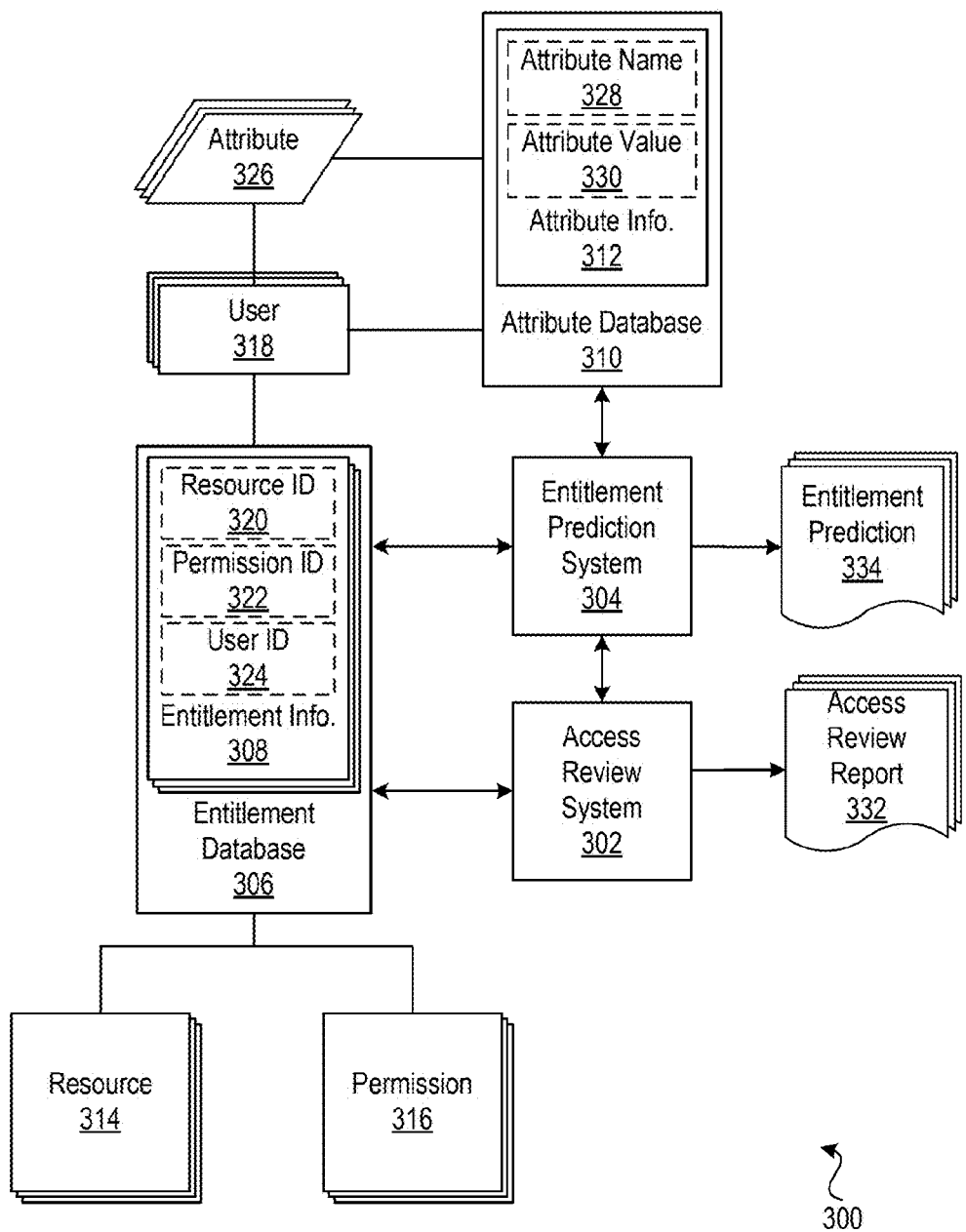
FIG. 3 is a block diagram of an example of an implementation of a system for predicting entitlements for access reviews.

Referring now to FIG. 3, an example of an implementation of a system 300 for predicting entitlements for access reviews is shown. The system 300, in this example, includes an access review system 302 that may be utilized to conduct access reviews; an entitlement prediction system 304 that, in operation, predicts entitlements for a user; an entitlement database 306 that stores entitlement information 308; and an attribute database 310 that stores user attribute information 312. The access review system 302 may be in signal communication with the entitlement prediction system 304 and the entitlement database. The entitlement prediction system 304 may be in signal communication with the access review system 302, the entitlement database 306, and the attribute database 310.

The entitlement database 306 may store entitlement information 308. The entitlement database 306 may implement a data model that defines relationships between resources 314, permissions 316, and users 318 in order to model entitlements. The resources 314, permissions 316, and users 318 may be identified in the entitlement database 306 through respective identifiers ("IDs"). Accordingly, the entitlement information 308 for an entitlement may indicate the resource ID 320 of the resource 314, the permission ID of the permission 322, and the user ID of the user 318 (or the user account associated with the user). The system 300 may also include a database management system (not shown) that manages the storage of entitlement information at and the retrieval of entitlement information from the entitlement database 306.

The attribute database 310 may similarly store attribute information 312 corresponding to the attributes 326 associated with a user. The attribute information 312 may include the name 328 of the attribute and the value 330 for the attribute. The name 328 of the attribute may identify the type of attribute (e.g., "Location"), and the value 330 for the attribute may indicate the particular characteristic of the user (e.g., "North America," "Europe," or "Asia"). The attribute database may similarly implement a data model that defines relationships between users 318 and attributes 326. The system 300 may likewise include a database management system (not shown) that manages the storage of attribute information at and the retrieval of attribute information from the attribute database 310.

It will be appreciated that the entitlement database 308 and the attribute database 310 may be the same database or different databases. Additionally, the entitlement database 308 and the attribute database 310 may respectively include multiple databases in signal communication with each other and respectively store the entitlement information 308 and attribute information 312 across the multiple databases in a distributed fashion. Moreover, the entitlement database 308 and the attribute database 310 may be respectively managed by the same database management system or different database management systems.

The access review system 302 may, in operation, query the entitlement database 306 for the entitlement information 308 associated with a selected user. The user may be selected manually using the access review system 302, e.g., by a manager conducting an access review. The user may also be selected automatically, e.g., by the access review system 302 as part of an automated process. In this regard, the access review system 302 may be configured to automatically query the entitlement database 306 on a periodic basis and retrieve the entitlements associated with one or more users. The access review system 302 may list the retrieved entitlements in an access review list 332 and provide the list to a manager to review, e.g., in an email.

The entitlement prediction system 304 may, in operation, determine one or more entitlement predictions 334 for a user. To determine the entitlement predictions 334, the entitlement prediction system 304 may also, in operation, query the entitlement database 306 for the entitlement information 308 associated with various users as well as the attribute database 310 for attribute information 312 associated with various users. The entitlement prediction system 304 may then analyze the entitlements for a selected user based on a set of attributes associated with the user and based on the entitlement information 308 and attribute information 312 respectively retrieved from the entitlement database 306 and the attribute database 310. Some or all of the attributes associated with a selected user may be selected as the set of attributes to analyze the entitlements with. In some example embodiments, the set of attributes used to analyze the entitlements may include a job code attribute, a location attribute, and a manager attribute.

It will be appreciated that an entitlement may depend on one or more particular attributes while being independent of other attributes. In order to account for this difference, the entitlement prediction system 304 may determine an affinity for each entitlement-attribute pair. As previously described, the affinity may indicate the dependency between the entitlement and the attribute. The entitlement prediction system 304 may thus utilize the affinity values to respectively weight attributes when determining an entitlement prediction 334. Determining affinity values and entitlement predictions will be discussed in further detail below.

The entitlement prediction system 304 may further, in operation, modify (or otherwise influence the creation of) an access review list 332 based on the entitlement predictions. In one example, the entitlement prediction system 304 may instruct the access review system to exclude from an access review list 332 any entitlements having an entitlement prediction 334 above a predetermined prediction threshold. In this example, the access review list 332 would thus only include entitlements for which the entitlement prediction 334 falls below the predetermined prediction threshold. As a result, the number of entitlements presented to a manager for review is advantageously reduced thereby improving the ability of the manager to accurately conduct the access review. In another example, the entitlement prediction system 304 may provide the entitlement predictions 334 to the access review system 302, and the access review system may organize an access review list 332 based on the entitlement predictions. Access review lists 332 will be discussed in further detail below.

Figure 4:
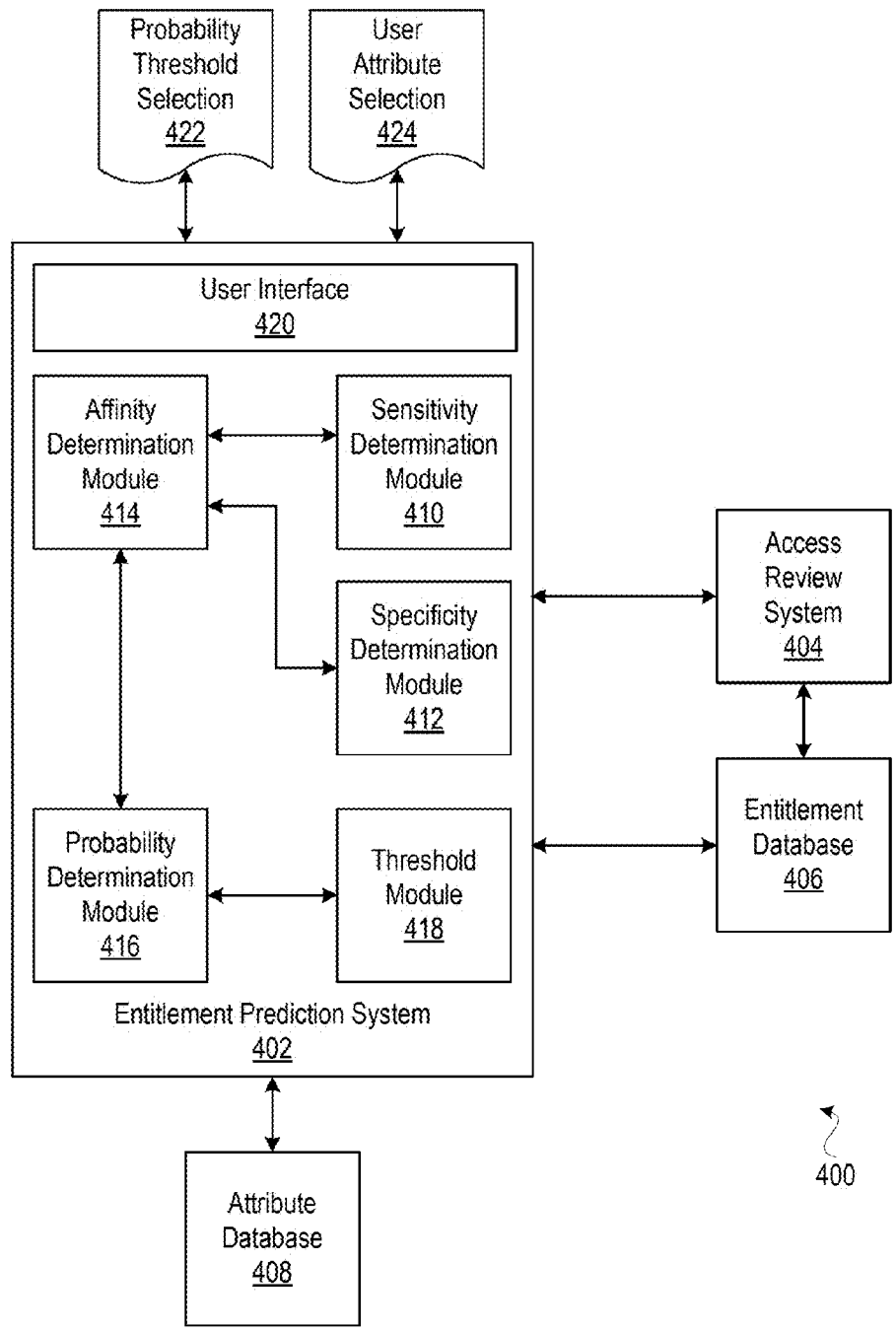
FIG. 4 is another block diagram of an example of an implementation of a system for predicting entitlements for access reviews.

In FIG. 4, another example of an implementation of a system 400 for predicting entitlements for access reviews is shown. As previously described, an entitlement prediction system 402 may be in signal communication with an access review system 404, an entitlement database 406, and an attribute database 408. The entitlement prediction system 402, in this example, includes a sensitivity determination module 410, a specificity determination module 412, an affinity determination module 414, a probability determination module 416, and a threshold module 418. The affinity determination module 414 may be in signal communication with the sensitivity determination module 410, the specificity determination module 412, and the probability determination module 416 (and vice versa). The probability determination module 416 may also be in signal communication with the threshold module 418 (and vice versa).

The sensitivity determination module 410, in operation, determines a sensitivity value for an attribute-entitlement pair. As previously described, sensitivity refers to a relationship between an entitlement and a particular attribute value. In this description, an attribute value having at least one user with the entitlement is referred to as a mode. Accordingly, the sensitivity value for an attribute-entitlement pair may be based on the total number of users with the entitlement across all modes of the attribute and the total number of users in all modes of the attribute. The sensitivity determination module 410 may query the entitlement database 406 and the attribute database 408 for the entitlement information and attribute information indicating the users having an entitlement and the attribute values of those users. Based on the entitlement information and attribute information retrieved, the sensitivity determination module 410 may thus identify the modes of an attribute, determine the total number of users across the modes of the attribute, and determine the total number of users in those modes that also have the entitlement.

In some example embodiments, the sensitivity determination module 410 may obtain a sensitivity value for an attribute-entitlement pair using the following equation:

$$N(R,E) = \text{Total}_E / \text{Total}_M$$

where $N(R, E)$ is the sensitivity value for an attribute, R, with respect to an entitlement, E; where $\text{Total}_E$ is the total number of users having the entitlement, E; and where $\text{Total}_M$ is the total number of users in all modes of the attribute, R.

As an example, consider an attribute, R, with one-hundred users across all modes of the attribute (e.g., $\text{Total}_M=100$). If the total number of users with an entitlement, E, in the modes of the attribute, R, is twenty (e.g., $\text{Total}_E=20$), then the attribute, R, may be described as having a relatively low sensitivity (e.g., $N(R, E)=20/100=0.20$). If, however, the total number of users with the entitlement, E, in the modes of the attribute, R, is eighty (e.g., $\text{Total}_E=80$), then the attribute, R, may be described as having a relatively high sensitivity (e.g., $N(R\ E)=80/100=0.80$). It will be appreciated that alternative sensitivity values may be described as relatively high or relatively low depending on the particular implementation of the entitlement prediction system 402.

The specificity determination module 412, in operation, determines a specificity value for an attribute-entitlement pair. As previously described, specificity refers to a relationship between an entitlement and the pool of unique values of an attribute. Accordingly, the specificity value for an attribute-entitlement pair may be based on the total number of modes of the attribute and the total number of unique values for the attribute.

The specificity determination module 412 may thus also query the entitlement database 406 and the attribute database 408 for the entitlement information and attribute information indicating the users having an entitlement and the attribute values of those users. Based on the entitlement information and attribute information retrieved, the specificity determination module 412 may thus determine the total number of modes of an attribute and determine the total number of unique values for the attribute. In some example embodiments, the specificity determination module may normalize the specificity value, C(R, E), to 1.0 to accommodate situations where there is only one mode.

Accordingly, the specificity determination module 412 may obtain a specificity value for an attribute-entitlement pair using the following equation $$C(R,E) = 1 - [(\text{Num}_{Modes} - 1) / \text{Num}_{Values}]$$

wherein $C(R, E)$ is the specificity value for an attribute, R, with respect to an entitlement, E; where $\text{Num}_{Modes}$ is the total number of modes of the attribute, R; and where $\text{Num}_{Values}$ is the total number of unique values for the attribute, R.

As an example, consider an attribute, R, with twenty unique values, $R_{iv}$ where $i=1 \ldots 20$) for the attribute (e.g., $\text{Num}_{Values}=20$). If the total number of modes is eighteen (e.g., $\text{Num}_{Modes}=18$), then the attribute, R, may be described as having a relatively low specificity (e.g., $C(R, E)=1-[(18-1)/20]=0.15$). If, however, the total number of modes is two (e.g., $\text{Num}_{Modes}=2$), then the attribute, R, may be described as having a relatively high specificity (e.g., $C(R, =1-[(2-1)/20]=0.95$). It will be appreciated that alternative specificity values may be described as relatively high or relatively low depending on the particular implementation of the entitlement prediction system 402.

In view of these disclosures, it will be further appreciated that a relatively high sensitivity value and a relatively high specificity value may indicate a relatively strong dependency between an entitlement, E, and an attribute, R. The affinity value may quantify this dependency. Accordingly, the affinity determination module 414 may determine the affinity of an entitlement to an attribute by obtaining an affinity value based on the sensitivity value and the specificity value. The affinity determination module 414 may receive the sensitivity value from the sensitivity determination module 410 and may receive the specificity value from the specificity determination module 412.

As previously described, affinity refers to the dependency between an entitlement and an attribute, in other words, whether the attribute is a useful indicator to predict whether a user has the entitlement. An entitlement may have a relatively high affinity to one attribute or multiple attributes. An entitlement may also have a relatively low affinity to one attribute or multiple attributes. An entitlement may further have no affinity to an attribute, e.g., where the sensitivity value or the specificity value is zero. In view of these disclosures, it will be appreciated that a relatively high affinity value for an attribute-entitlement pair may indicate that the attribute is a relatively more useful indicator to predict whether a user has the entitlement and a relatively low affinity value may indicate that the attribute is a relatively less useful indicator to predict whether the user has the entitlement.

In some example embodiments, the affinity determination module may obtain an affinity value for an attribute-entitlement pair using the following equation:

$$A(R,E) = N(R,E) \times C(R,E)$$

where $A(R, E)$ is the affinity value for an attribute, R, with respect to an entitlement, E; where $N(R, E)$ is the sensitivity value for the attribute, R, with respect to the entitlement, E; and where $C(R, E)$ is the specificity value for the attribute, R, with respect to the entitlement, E. It will be appreciated that by combining the sensitivity and the specificity via a product increases the confidence level of the affinity value when both the sensitivity and the specificity are relatively high. As described in further detail below, the affinity value, $A(R, E)$, may thus be used as a weight when determining an entitlement probability for a user.

The probability determination module 416, in operation, determines the probability a user has a particular entitlement. The probability that a user with the set of attributes has the entitlement may be quantified as an entitlement probability value. The probability determination module may thus determine an entitlement probability value, $P(X, E)$, for a set of attributes, X, with respect to an entitlement, E. The set of attributes, X, refers to a collection of one or more attributes, $\{R_1, \ldots R_n\}$. Stated differently, the probability determination module 416 determines a value indicating the probability that a user having the set of attributes, X, also has the entitlement, E. The probability determination module may determine the entitlement probability, $P(X, E)$, based on the respective partial probabilities, $p(R_{iv})$, of the attributes, $R_i$, in the set of attributes, X, and based on the respective affinities, $A(R_i, E)$, for those attributes with respect to the entitlement, E. The probability determination module 416 may determine the partial probabilities for the attributes and may receive the affinity values from the affinity determination module 414.

Partial probability refers to the probability that a user having a particular value, $R_{iv}$, for an attribute, $R_i$, also has the entitlement, E. The probability determination module may determine the partial probability, $p(R_{iv})$, for a particular value of attribute, $R_i$, with respect to an entitlement, E, by dividing the total number of users having the particular attribute value along with the entitlement by the total number of users having the particular attribute value. In some example implementations, the probability determination module may exclude the user for whom the partial probability, $p(R_{iv})$, is calculated by subtracting one from the total number of users ($\text{Num}_{RE}$) that have both the particular value of attribute value, $R_{iv}$, and the entitlement, E.

Accordingly, the probability determination module may obtain a partial probability value for a particular attribute value using the following example equation:

$$p(R_{iv}) = (\text{Num}_{RE} - 1)/\text{Num}_R$$

where $p(R_{iv})$ is the partial probability for the particular value of attribute, $R_i$; where $\text{Num}_{RE}$ is the total number of users having the particular value of attribute value, $R_{iv}$, along with the entitlement, E; and where $\text{Num}_R$ is the total number of users having the particular value, $R_{iv}$, of the attribute, $R_i$. It will be appreciated that the partial probability, $p(R_{iv})$, for a particular value of attribute, $R_i$, will thus be relatively high (e.g., closer to 1.0) where every user having that particular value of the attribute also has the entitlement, E. It will also be appreciated that the partial probability, $p(R_{iv})$, for a particular value of attribute, $R_i$, will be relatively low (e.g., closer to 0.0) where none of the users having that particular value of the attribute have the entitlement, E.

As an example, consider a particular attribute value, $R_{1v}$, with fifty total users having that particular attribute value (e.g., $\text{Num}_R = 50$). If the total number of users also having an entitlement, E, is five (e.g., $\text{Num}_{RE} = 5$), then the partial probability value, $p(R_{1v})$, of that particular attribute value, $R_{1v}$, with respect to the entitlement, E, may be described as relatively low (e.g., $p(R_{1v}) = (5-1)/50 = 0.08$). If, however, the total number of users also having an entitlement, E, is forty-five (e.g., $\text{Num}_{RE} = 45$), then the partial probability value, $p(R_{1v})$, of that particular attribute value, $R_{1v}$, with respect to the entitlement, E, may be described as relatively high (e.g., $p(R_{1v}) = (44-1)/50 = 0.88$).

When determining an entitlement probability value, $P(X, E)$, the probability determination module 416 may receive from the affinity determination module 414 affinity values, $A(R_i, E)$, for each attribute, $R_i$, in the set of attributes, X. The probability determination module 416 may also determine partial probabilities, $p(R_{iv})$, for the particular values of the attributes, $R_i$, in the set of attributes, X.

As previously mentioned, the probability determination module 416 may utilize the affinity values, $A(R_i, E)$, as respective weights when determining an entitlement probability value. In some example embodiments, the probability determination module 416 may utilize an affinity value, $A(R_i, E)$, to weight a partial probability, $p(R_{iv})$, of a particular value, $R_{iv}$, of an attribute, $R_i$. In this way, an attribute having a relatively high affinity to the entitlement may contribute relatively more to the entitlement probability and an attribute having a relatively low affinity to the entitlement may contribute relatively less to the entitlement probability. In some example embodiments, the probability determination module 416 may obtain a weighted partial probability based on the product of the partial probability, $p(R_{iv})$, for a particular value of an attribute with the affinity value, $A(R, E)$, for the attribute, e.g., $A(R, E) \times p(R_{iv})$.

Because the entitlement probability is based on a set of attributes, X, the entitlement probability value, $P(X, E)$, may be based on a sum of the weighted partial probabilities, $p(R_{iv})$, respectively corresponding to the attributes, $R_i$, in the set of attributes, X. To normalize the respective affinity values, $A(R_i, E)$, associated with the attributes, $R_i$, in the set of attributes, X, the entitlement probability value may also be based on a sum of the respective affinity values.

In some example embodiments, the probability determination module may obtain an entitlement probability value for a set of attributes with respect to an entitlement using the following equation:

$$P(X, E) = \frac{\sum_{i=1}^{n} [A(R_i, E) \times p(R_{iv})]}{\sum_{i=1}^{n} A(R_i, E)}$$

where $P(X, E)$ is the entitlement probability for the set of attributes, X, with respect to the entitlement, E; where X is a set of one or more attributes, $\{R_1, \ldots, R_n\}$; where $A(R_i, E)$ is the affinity value for the attribute, $R_i$, with respect to the entitlement, E; and where $p(R_{iv})$ is the partial probability of the particular attribute value, $R_{iv}$, of the user for the attribute, $R_i$.

The entitlement probability value may range from zero to one (0-1). An entitlement probability value closer to zero indicates a relatively low likelihood that a user having the set of attributes, X, also has the entitlement, E. An entitlement probability value closer one indicates a relatively high likelihood that a user having the set of attributes, X, also has the entitlement, E. The entitlement probability value may then be compared to a probability threshold to determine how the entitlement should be handled with respect to an access review.

The threshold module 418, in operation, may determine whether an entitlement should be flagged for review based on the entitlement probability for the entitlement and a probability threshold. The threshold module 418 may thus receive an entitlement probability value for an entitlement from the probability determination module 416. The threshold module 418 may then compare the entitlement probability value to a probability threshold. If the entitlement probability value is less than the probability threshold, then the threshold module may flag the entitlement for review. If, however, the entitlement probability value is greater than or equal to the probability threshold, the threshold module may not flag the entitlement for review.

In some example embodiments, the threshold module may initiate an instruction to an access review system that instructs the access review system to exclude the entitlement from an access review or from an access review list prepared for an access review. In other example embodiments, the threshold module may initiate a notification to the access review system that notifies the access review system the entitlement probability for the entitlement is above the probability threshold. The access review system, in this example, may thus determine how to handle the entitlement during an access review, e.g., by excluding the entitlement from the access review or by including the entitlement in a section of an access review list indicating entitlements the user is predicted to have.

In some example implementations, the probability threshold may range from between around 0.60-0.90, and may be around 0.75 in one example implementation. The probability threshold may be adjusted depending on the particular implementation of the entitlement prediction system and the needs of an enterprise. Accordingly, the entitlement prediction system may further include a user interface 420 for receiving user input indicating a selection 422 of a desired probability threshold. An administrator or other individual of the enterprise may configure the entitlement prediction system 402 by providing the selection 422 of the desired probability threshold. A selection 424 of user attributes may also be received at the user interface 420. In this way, an administrator or other individual of the enterprise may configure the entitlement prediction system 402 by indicating which user attributes should be included in the set of user attributes, X, the entitlement prediction is based on.

Figure 5:
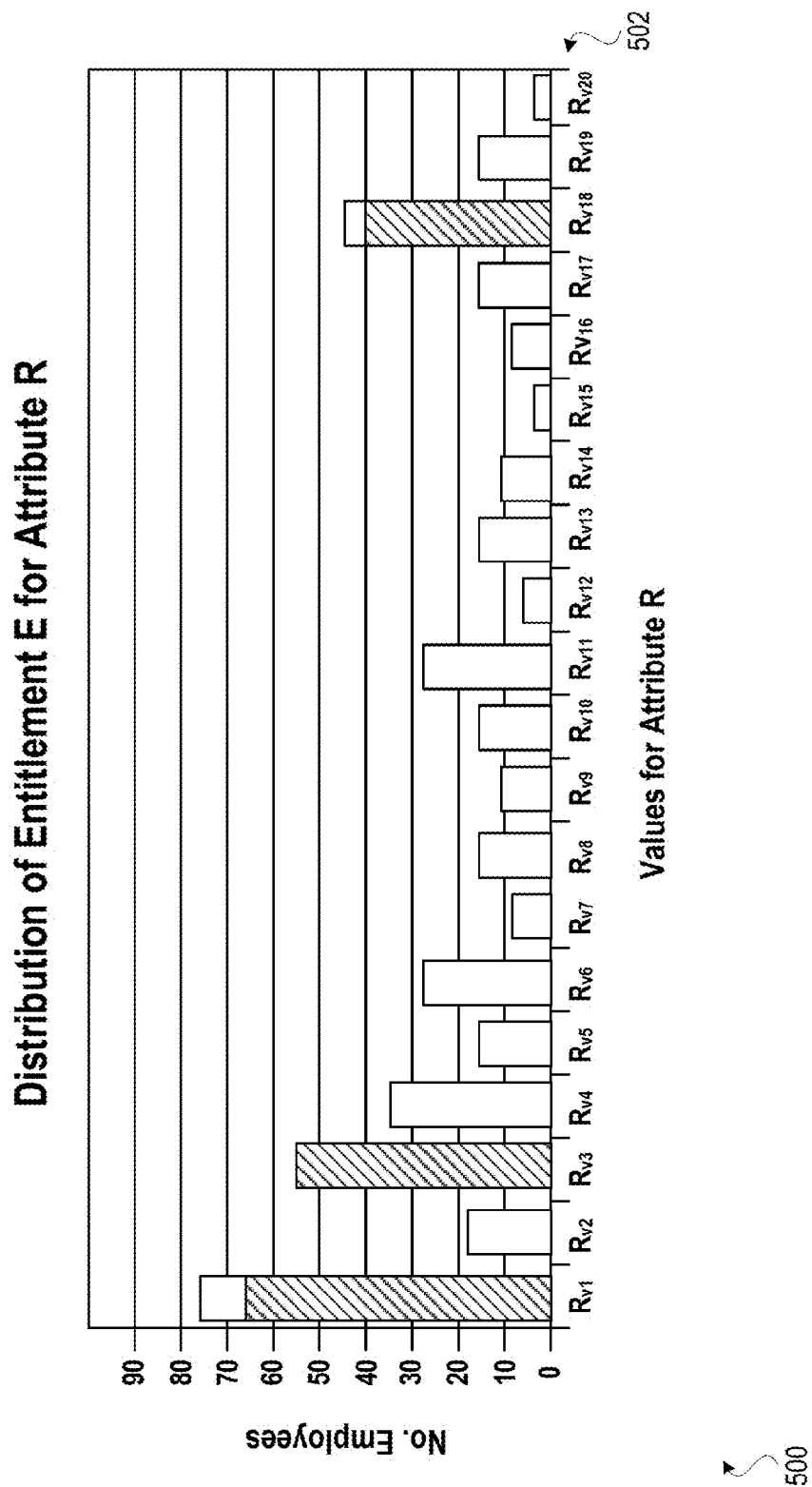
FIG. 5 is a bar graph illustrating a set of attribute values plotted against the number of employees having a respective attribute value and the number of employees having an entitlement.

In FIG. 5, a bar graph 500 illustrating a set of attribute values 502 plotted against the number of employees having a respective attribute value, R, and the number of employees having an entitlement, E, is shown. In FIG. 5, the number of employees having a particular value for the attribute, R, is illustrated by an un-shaded bar, and the number of employees having a that particular attribute value along with the entitlement, E, is illustrated by a shaded bar.

As seen in the example of FIG. 5, the attribute, R, includes a total of twenty unique values, $R_{v1}$ to $R_{v20}$. Three of those attribute values ($R_{v1}$, $R_{v3}$, and $R_{v18}$) include at least one user also having the entitlement, E. Accordingly, the attribute, R, in this example, includes a total of three modes. Therefore, the specificity value for this example attribute-entitlement pair is $C(R, E)=1-[(3-1)/20]=0.90$. In this example, the number of users in the three modes totals 170, and the number of users having the entitlement in the three modes totals 150. Therefore, the sensitivity value for this example attribute-entitlement pair is $N(R, E)=150/170 \approx 0.88$. In turn, the affinity value for this example attribute-entitlement pair is $A(R, E)=0.88 \times 0.90=0.792 \approx 0.79$.

As also seen in the example of FIG. 5, attribute $R_{v1}$ includes a total of seventy-five users overall and sixty-five users with the entitlement; attribute $R_{v3}$ includes a total of fifty-five users overall with all fifty-five users having the entitlement; and attribute $R_{v18}$ includes a total of forty-five users overall and forty users with the entitlement. Accordingly, the partial probabilities for attribute values $R_{v1}$, $R_{v3}$, and $R_{v18}$ are as follows: $p(R_{v1})=(65-1)/75 \approx 0.85$; $p(R_{v3})=(50-1)/50=0.98$; and $p(R_{v18})=(40-1)/45 \approx 0.87$. The partial probabilities of the attribute values, $R_{v1}$ to $R_{v20}$, may thus be utilized when determining an entitlement probability for the entitlement, E, based on a set of attributes that includes the attribute, R.

Figure 6:
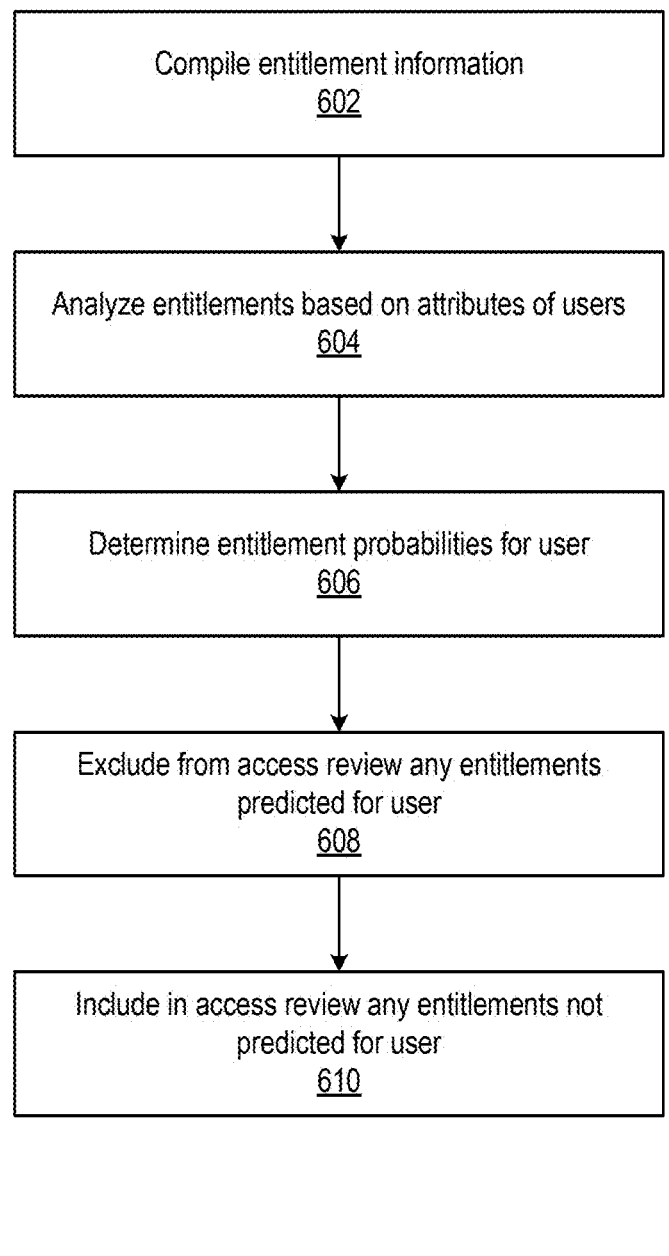
FIG. 6 is a flowchart of example method steps for predicting entitlements for access reviews.
Figure 7:
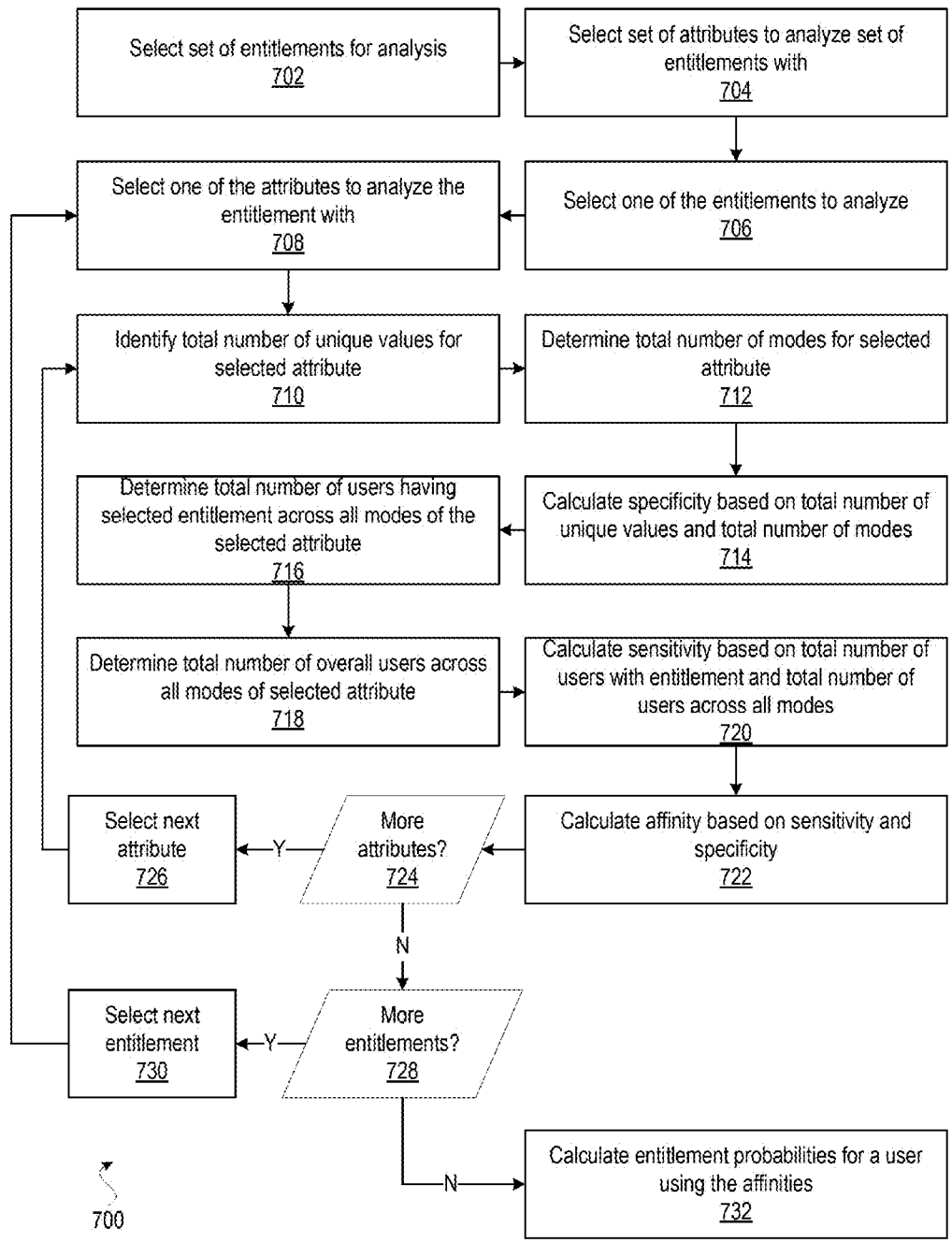
FIG. 7 is a flowchart of example method steps for determining respective affinity values for a set of attributes with respect to an entitlement.
Figure 8:
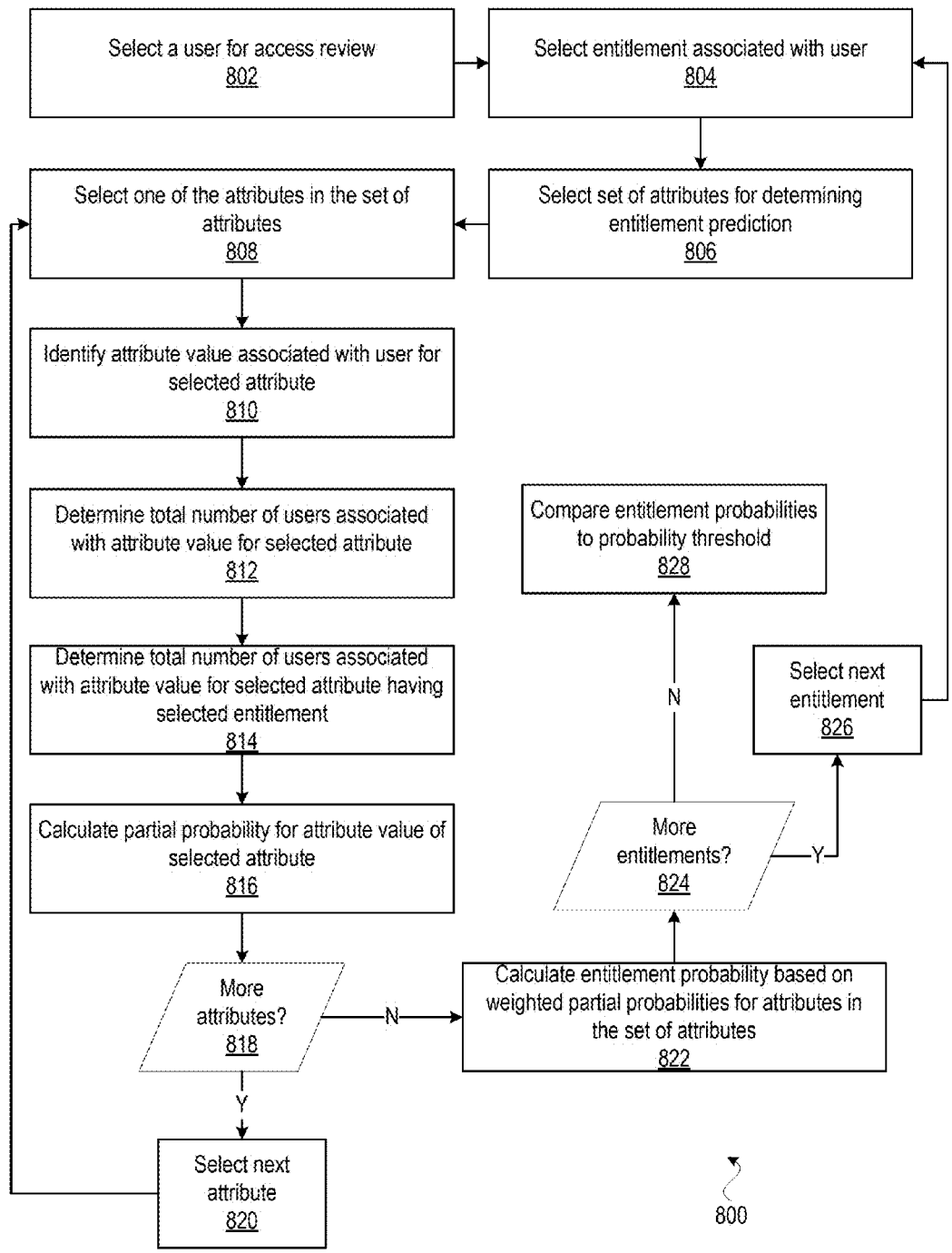
FIG. 8 is a flowchart of example method steps for determining respective entitlement probabilities for a set of entitlements.

FIGS. 6-8 illustrate example method steps for carrying out the aspects of the approaches described above. In FIG. 6, a flowchart 600 illustrates an example overview of the process of predicting entitlements for access reviews. An enterprise may provision entitlements for multiple users and compile entitlement information regarding the provisioned entitlements (block 602). An entitlement prediction system may analyze the entitlement information based on the attributes of the users (block 604). Through the analysis of the entitlement information with respect to user attributes, the entitlement prediction system may determine entitlement probabilities for the users (block 606). The entitlement prediction system may cause entitlements a user is predicted to have to be excluded from an access review for that user (block 608). The entitlement prediction system may also cause entitlements the user is not predicted to have to be included in the access review for that user (block 610). Various steps of this example overview are discussed in further detail below.

Referring to FIG. 7, a flowchart 700 of example method steps for determining respective affinity values for a set of attributes with respect to an entitlement is shown. An enterprise may select a set of entitlements to analyze (block 702). In some example implementations, an enterprise may select for analysis all of the entitlements provisioned for all of the user of the enterprise. A set of attributes to analyze the set of entitlements with may also be selected (block 704). As previously described, the set of attributes may include the job code, the location, and the manager of a user. An enterprise prediction system may be configured to select a particular set of attributes or, additionally or alternatively, an administrator of the enterprise may manually select the set of attributes.

The entitlement prediction system may select one the entitlements in the set of entitlements to analyze with the selected set of attributes (block 706). The entitlement prediction system may then select one of the attributes in the set of attributes (block 708) to obtain an attribute-entitlement pair as described above. The entitlement prediction system may determine the total number of unique values of the selected attribute (block 710) and determine the total number of modes for the selected attribute (block 712). The entitlement prediction system may determine the total number of modes by determining the total number of unique values of the attribute having at least one user with the entitlement. The entitlement prediction system may then calculate a specificity value based on the total number of unique values of the attribute and the total number of modes of the attribute (block 714) as described above.

The entitlement prediction system may then determine the total number of users having the entitlement across all modes of the selected attribute (block 716) as well as the total number of overall users across all modes of the selected attribute (block 718). The entitlement prediction system may then calculate a sensitivity value based on the total number of users across all modes of the selected attribute and the total number of users with the entitlement across all modes of the selected attribute (block 720) as described above. Having obtained the specificity value and the sensitivity value, the entitlement prediction system may calculate an affinity value for the attribute-entitlement pair based on the specificity value and the sensitivity value (block 722) as described above.

The entitlement prediction system may repeat various steps shown in FIG. 7 to obtain affinity values for additional attribute-entitlement pairs. Accordingly, if there are more attributes in the set of attributes to analyze the selected entitlement with (block 724:Y), the entitlement prediction system may select the next attribute (block 726) to obtain a new attribute-entitlement pair. The entitlement prediction system may thus repeat steps 710-722 to obtain an affinity value for the new attribute-entitlement pair.

The entitlement prediction system may also repeat various steps shown in FIG. 7 to obtain affinity values for another entitlement. Accordingly, the set of attributes does not include any additional attributes to analyze a selected entitlement with (block 724:N), the entitlement prediction system may determine whether there are any additional entitlements to analyze with the set of entitlements (block 728). If there are additional entitlements to analyze based on the set of attributes (block 728:Y), then the entitlement prediction system may select the next entitlement (block 730) and repeat steps 708-726 to determine affinity values for new pairings of the attributes with the new entitlement selected. If there are no more entitlements for the entitlement prediction system to analyze based on the set of attributes (block 728:N), the entitlement prediction system may determine entitlement probabilities for the entitlements provisioned for a user using the affinities obtained (block 732).

With reference to FIG. 8, a flowchart 800 of example method steps for determining respective entitlement probabilities for a set of entitlements is shown. Once an enterprise has obtained affinities for attribute-entitlement pairs, the enterprise may utilize those affinities to predict entitlements for users during access reviews. As described above, an enterprise may periodically conduct access reviews of the entitlements respectively provisioned for its users. Accordingly, a user may be selected for an access review (block 802).

During an access review, the entitlements associated with the selected user may be reviewed to determine whether the user is authorized to have the entitlement. As described above, some of the entitlements for a user may be excluded from manual review if the user is predicted to be authorized to have the entitlement above a threshold level of confidence. The entitlement prediction system may thus select one of the entitlements associated with user (block 804) and may select a set of attributes to determine the entitlement prediction with (block 806). As noted above, the set of attributes may include, e.g., a job code, a location, and a manger for the selected user.

The entitlement prediction system may then select one of the attributes from the set of attributes (block 808) and identify the particular attribute value of the attribute for the selected user (block 810). For example, the particular value for a location attribute associated with a user may be "North America." The entitlement prediction system may then determine the total number of users that also have the particular attribute value for the selected attribute (block 812), e.g., the total number of users where the value of their respective location attributes is "North America." The entitlement prediction system may then determine the total number of users having the particular attribute value for the selected attribute and have the selected entitlement (block 814), e.g., the total number of users having the "North America" location attribute value along with the entitlement. The entitlement prediction system may thus determine the partial probability value for the particular attribute value of the selected attribute with respect to the selected entitlement (block 816), e.g., the partial probability of the "North America" location attribute value.

The entitlement prediction system may obtain partial probabilities for each of the attributes in the set of selected attributes. Accordingly, if there are additional attributes in the set of attributes (block 818:Y), then the entitlement prediction system may select the next attribute from the set of attributes (block 820) and repeat steps 808-818 to obtain a partial probability value for the next attribute selected with respect to the selected entitlement. Once the entitlement prediction system has obtained partial probabilities for each attribute in the set of attributes (block 818:N), the entitlement prediction system may calculate an entitlement probability value for the selected entitlement based on weighted partial probabilities for the attributes in the set of attributes (block 822). As described above, the entitlement prediction system may weight a partial probability of an attribute-entitlement pair with the affinity value for the attribute-entitlement pair and sum the weighted partial probabilities of the attributes As also described above, the entitlement prediction system may divide the sum of the weight partial probabilities by the sum of the affinity values for the attributes in order to obtain the entitlement probability value for the selected entitlement.

The entitlement prediction system may repeat this process for each entitlement associated with the selected user. Accordingly, if there are additional entitlements to obtain entitlement predictions for (block 824:Y), the entitlement prediction system may select the next entitlement associated with the user (block 826) and repeat steps 804-822 to obtain additional entitlement probability values. Once the entitlement prediction system has obtain entitlement probability values the entitlements associated with the selected user (block 824:N), the entitlement prediction system may compare the entitlement probability values to a probability threshold (block 828) in order to determine whether to include the entitlements in a manual access review.

Figure 9:
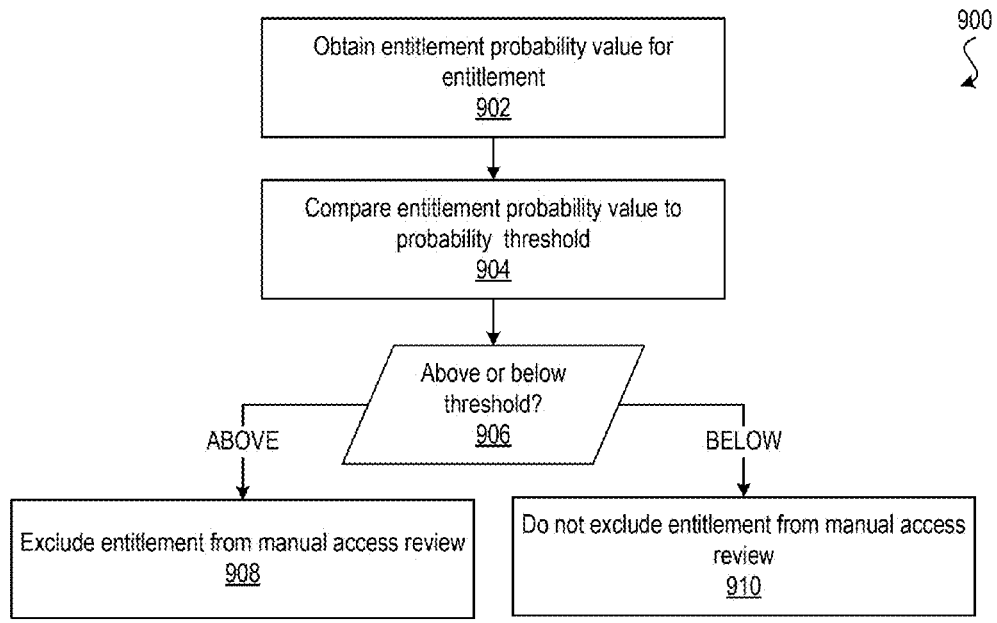
FIG. 9 is a flowchart of example method steps for comparing an entitlement probability value to a probability threshold.

In FIG. 9, a flowchart 900 of example method steps for comparing an entitlement probability value to a probability threshold. The entitlement prediction system may obtain an entitlement probability value for a user (block 902) and compare the entitlement probability value to a probability threshold (block 904). The entitlement prediction system may then determine whether the entitlement probability value is above or below the probability threshold (block 906). If the entitlement probability value is above the probability threshold (block 906:ABOVE), then the entitlement prediction system may cause the entitlement associated with the entitlement probability value to be excluded from a manual access review of the user (block 908) as described above. If, however, the entitlement probability value is below the probability threshold (block 906:BELOW), then the entitlement prediction system may not cause the entitlement to be excluded from the manual access review of the user (block 910).

An enterprise may also employ the entitlement probability values to assist in user role engineering. Over time, an enterprise may compile a pool of entitlement probability values for entitlements associated with users of the enterprise. Role engineers of an enterprise may obtain the entitlement probability values an engineer user roles based on sets of attribute values associated with relatively high entitlement probability values. Users may then be associated with these attribute-based user roles, and the users may thus receive entitlements through the attribute-based user role.

Figure 10:
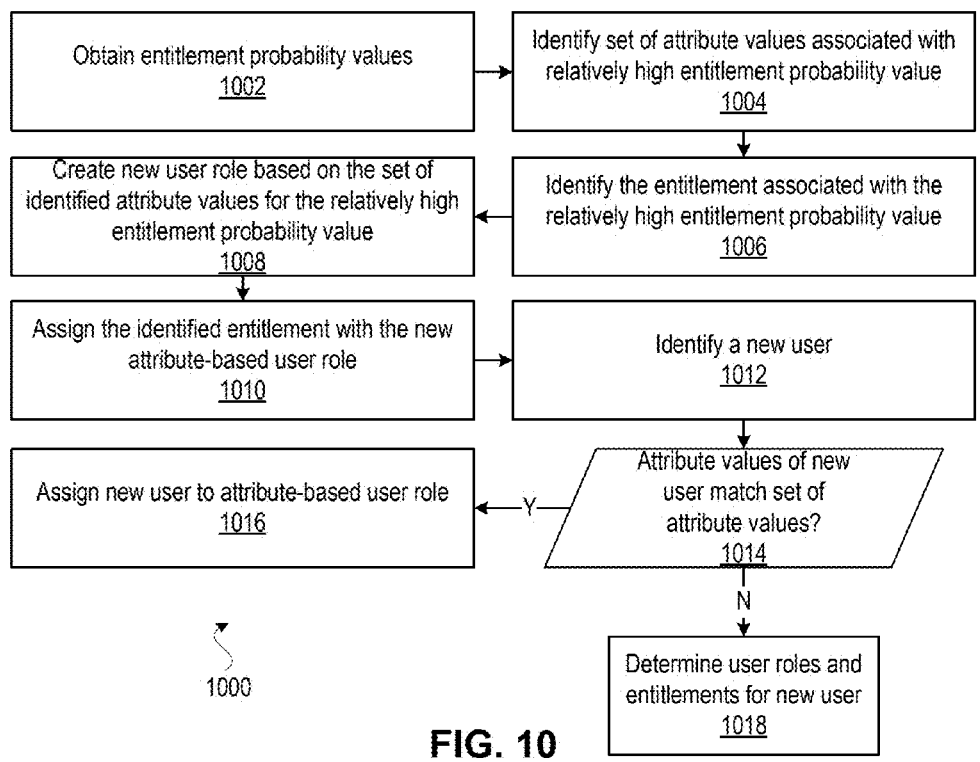
FIG. 10 is a flowchart of example method steps for engineering user roles based on entitlement probability values.

In FIG. 10, a flowchart 1000 of example method steps for engineering user roles based on entitlement probability values is shown. An enterprise may collect entitlement probability values (block 1002), e.g., from an entitlement prediction system as described above. Role engineers of the enterprise may then analyze the entitlement probability values to identify sets of attribute values respectively associated with relatively high entitlement probability values (block 1004), e.g., entitlement probability values between around 0.90-0.99. The role engineer may identify the entitlement associated with one of the relatively high entitlement probability values (block 1006) and create a user role based on the set of attribute values associated with the relatively high entitlement probability value (block 1008). The identified entitlement may then be assigned to the new attribute-based user role (block 1010) such that a user assigned to that user role receives the identified entitlement through the user role. In this way, multiple entitlements may be assigned to the user role, and the user role may be assigned to a user in order to provide multiple entitlements to the user. As a result, the number of individual entitlements assigned to individual user is advantageously reduced.

When a new user is identified (block 1012), the enterprise may determine whether the attribute values for the user match the set of attribute values corresponding to the user role (block 1014). If the attribute values for the new user match the attribute values corresponding to the user role (block 1014:Y), then the new user may be assigned to the user role (block 1016) such that the new user receives the entitlements associated with that user role. If the attribute values of the new user do not match the attribute values corresponding to an attribute-based user role (block 1014:N), then the new user may be assigned entitlements in an alternative fashion (block 1018), e.g., individually as described above.

As an example, entitlement probability values may be obtained based on a set of attributes that includes the job code, location, and manager of a user. The pool of entitlement probability values may include relatively high entitlement probability values for users having the following set of respective attributes values for job code, location, and manager: {"####", "North America", "Last Name, First Name"}. Accordingly, a role engineer may create a new user role based on these attribute values. If a new user has attribute values matching the attributes values corresponding to the attribute-based user role—e.g., if the job code of the new user is "####," the location of the new user is "North America," and the name of the manager of the new user is "Last Name, First Name"—then the new user may be assigned to the corresponding attribute-based user role in order to provide the new user with entitlements common for users having those particular attribute values.

It will be appreciated that some entitlements may pose more of a risk than other entitlements, e.g., with respect to the type of resource accessible through the entitlement. Therefore, the entitlement prediction system, in some example implementations, may be configured to refrain from excluding certain entitlements even if a user is predicted to be authorized for the entitlement with a relatively high entitlement probability value.

Figure 11:
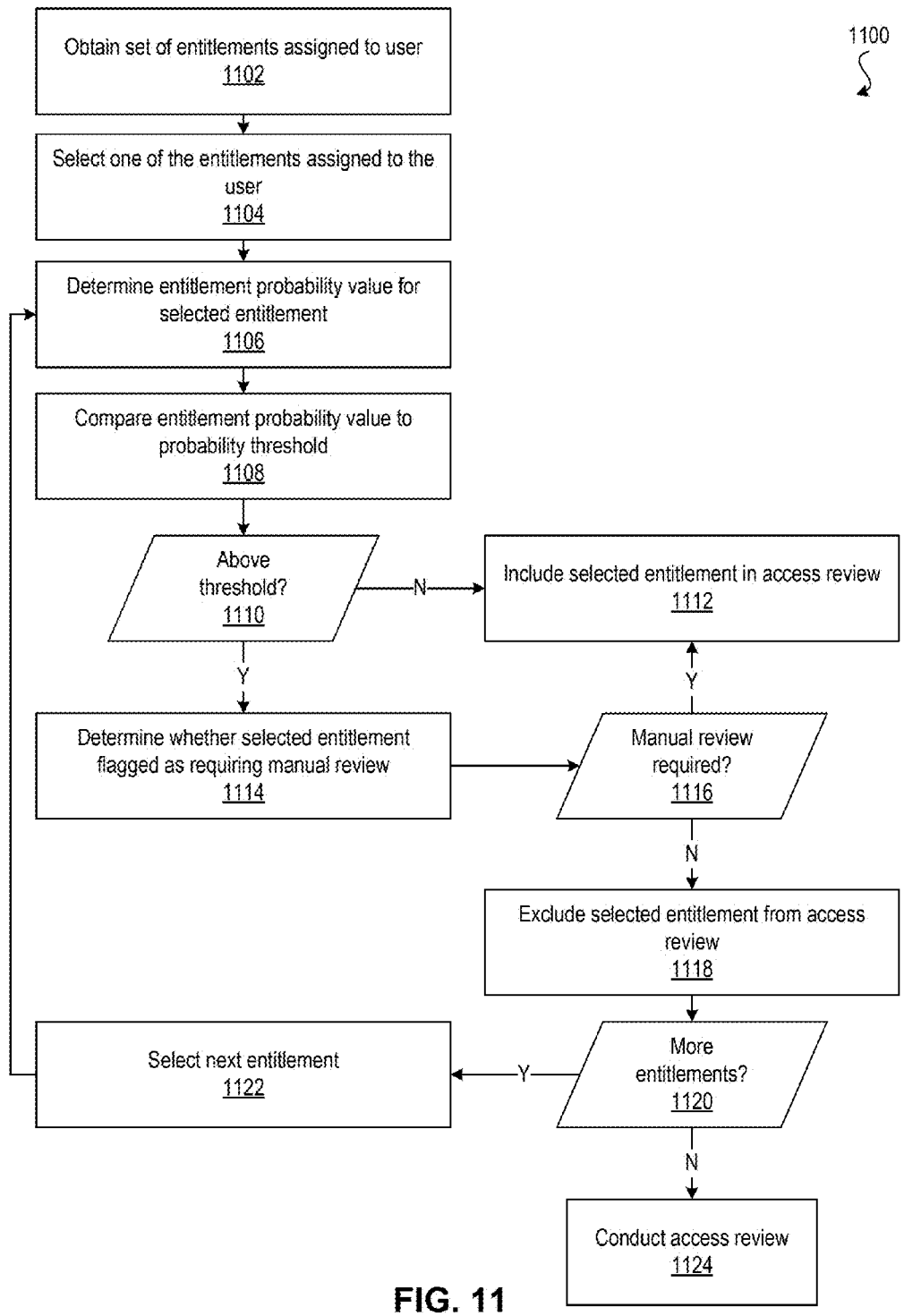
FIG. 11 is a flowchart of example method steps for determining whether to exclude an entitlement from an access review.

FIG. 11 is a flowchart 1100 of example method steps for determining whether to exclude an entitlement from an access review. An entitlement prediction system may obtain a set of entitlements assigned to a user (block 1102), and select one of the entitlements (block 1104) for analysis. The entitlement prediction system may determine an entitlement probability value for the selected entitlement (block 1106) and compare the entitlement probability value to a probability threshold (block 1108) as described above. If the entitlement probability value is not above the probability threshold (block 1110:N), then the entitlement prediction system may cause the selected entitlement to be included in an access review (block 1112). If, however, the entitlement probability value is above the probability threshold (block 1110:Y), then the entitlement prediction system may determine whether the selected entitlement has been flagged for manual review (block 1114). If manual review of the selected entitlement is required (block 1116:Y), then the entitlement prediction system may cause the selected entitlement to be included in an access review (block 1112). If, however, manual review of the selected entitlement is not required (block 1116:N) and the entitlement probability value is above the probability threshold, then the entitlement prediction system may exclude the selected entitlement from an access review (block 1118). If there are more entitlements to analyze (block 1120:Y), then the entitlement prediction system may select the next entitlement (block 1122) and repeat steps 1106-1118 for the next selected entitlement. If there are no more entitlements to analyze (block 1120:N), the access review may be conducted (block 1124). It will be appreciated that in other example implementations, the entitlement prediction system may simply automatically include in an access review an entitlement flagged as requiring manual review without determining an entitlement probability value for that entitlement.

Figure 12:
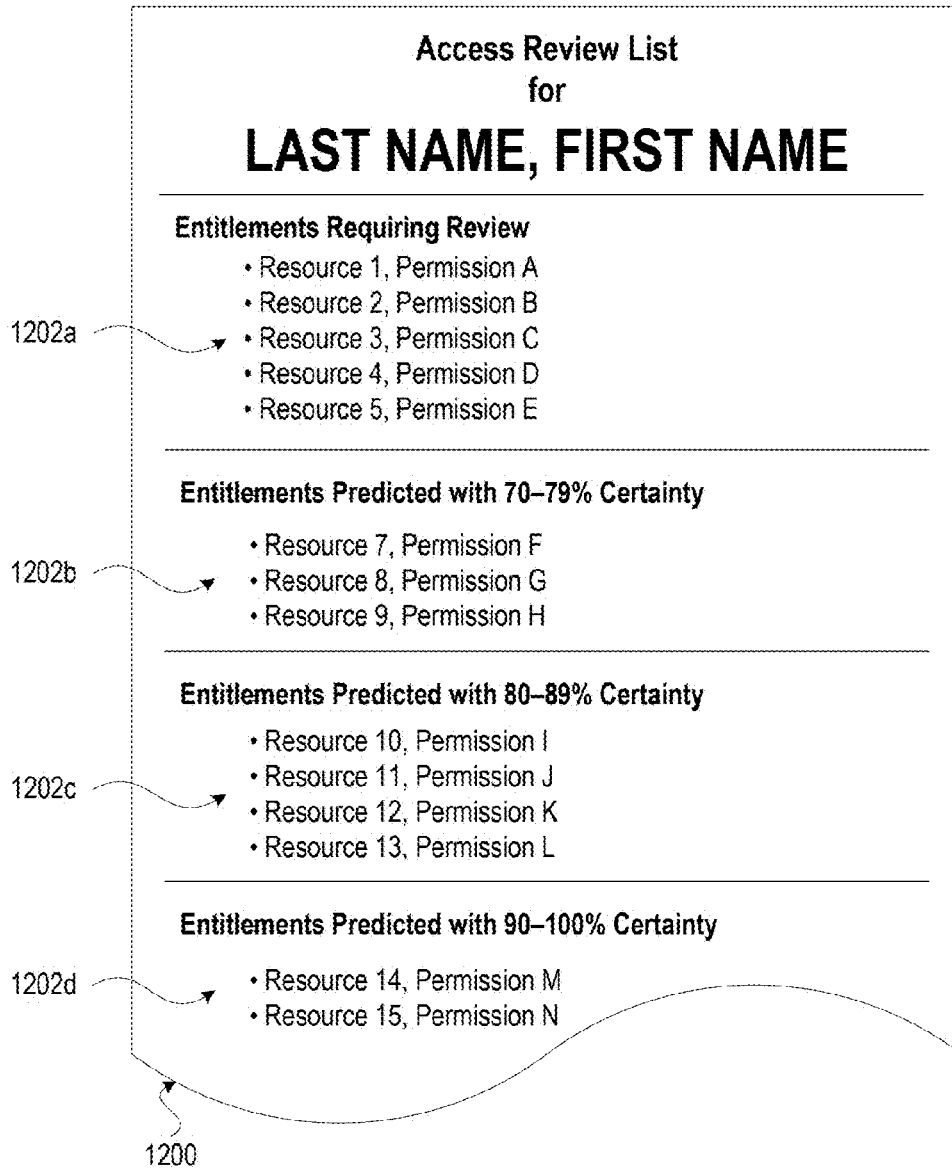
FIG. 12 is an example of an implementation of an access review list.

Finally in FIG. 12, an example of an implementation of an access review list 1200 is shown. An access review system may generate an access review list for a user and provide the access review list to a manager to review during an access review. The access review list may include a listing of the entitlements associated with the user, and the manager may review each entitlement listed in order to determine whether the user is authorized to have the entitlement listed. In order to improve access reviews and reduce the number of entitlements a manager must review, an entitlement review system may determine the probability that the user is authorized to have the entitlement. As described above, an entitlement prediction system may, in some example implementations, exclude from a manual access review entitlements associated with an entitlement probability value that exceeds a predetermined probability threshold. In other example implementations, however, the entitlement prediction system may cause an access review system to divide an access review list into various sections as shown by way of example in FIG. 12.

As described above, an entitlement corresponds to an associated between a user, a resource the user is permitted to access, and a permission defining access rights for the user with respect to the resource. Accordingly, the example access review list 1200 in FIG. 12 identifies the resources and respective permissions the user is entitled to access. The example access review list 1200 in FIG. 11 is divided into sections 1202a-d based on the entitlement probability values respectively associated with the entitlements. As shown by way of example, the access review list 1200 includes a section 1202a listing entitlements a manager is required to manually review, e.g., entitlements that are below a predetermined probability threshold of 0.70. The access review list 1200 also includes sections 1202b-d respectively listing entitlements that may not need to be manually reviewed by the manager since the respective entitlement probability values for those entitlements are above a predetermined probability threshold of, e.g., 0.70. In this example access review list 1200, section 1202b may identify one or more entitlements having an entitlement probability value between 0.70-0.79; 1102c may identify one or more entitlements having an entitlement probability value between 0.80-0.89; and 1202d may identify one or more entitlements having an entitlement probability value between 0.90-1.00. For sections 1202b-d in the example access review list 1200, a manager may simply skim the entitlements listed. In this way, the number of entitlements requiring manual review by the manager is advantageously reduced, which may in turn improve the accuracy of the manual reviews conducted by mangers during access reviews.

A preliminary test of the approaches set forth above was conducted on a set of almost 14 million (M) entitlements. With a probability threshold of 0.8, over 4M entitlements were correctly predicted with an accuracy of over 98%. Accordingly, the 4M entitlements accurately predicted were able to be excluded from subsequent access reviews, which represents a reduction of almost 30%. It will thus be appreciated that, when the number of entitlements needing review extends into the millions, a 30% reduction in the number of entitlements managers must manually review advantageously results in significant savings in man-hours and other enterprise resources. In addition, due to the high accuracy rate of the entitlement predictions, entitlements may be excluded from manual review without significantly impacting the access risk of the enterprise.

Moreover, when the approaches described above are combined with other approaches already known in the art, additional reductions in the number of entitlements requiring manual review may be achieved. For example, those skilled in the art will appreciate that entitlements common to all users of the enterprise may also be excluded from manual review. Another known approach may employ horizontal clustering techniques when analyzing the pool of entitlements to identify entitlement groups. Through such horizontal clustering techniques, entitlements may be grouped together if user ownership of the entitlements overlaps by more than a predetermined threshold, e.g., 98%. An additional approach may employ vertical clustering techniques to identify dependencies between entitlements. Vertical clustering techniques may identify entitlements that are always associated with one or more other entitlements, i.e., entitlements that depend on one or more other entitlements. Although such approaches may already be known in the art, these approaches may be performed in conjunction with the entitlement prediction approaches described above to achieve significant reductions in the number of entitlements requiring manual review.

Aspects of the disclosure have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure.

What is claimed is:

1. A system for predicting entitlements to computing resources, the system comprising:
  one or more processors;
  a first database storing attribute information identifying an attribute associated with a user of the computing system;
  a second database storing entitlement information identifying an entitlement that indicates a computing resource of the computer system that is accessible to the user; and
  memory storing instructions that, when executed by one of the processors, cause the system to
    obtain a specificity value for the attribute with respect to the entitlement based on a total number of unique attribute values of the attribute and a total number of unique values of the attribute that are associated with at least one user having the entitlement,
    obtain a sensitivity value for the attribute with respect to the entitlement based on a total number of users having the entitlement across all of the unique attribute values that are associated with at least one user having the entitlement and a total number of users across all of the unique attribute values that are associated with at least one user having the entitlement,
    obtain an affinity value for the attribute based on the specificity value and the sensitivity value,
    obtain a partial probability value for an attribute value of the attribute based on a total number of users having the entitlement that are associated with the attribute value and a total number of users that are associated with the attribute value,
    obtain an entitlement probability value based, at least in part, on the affinity value and the partial probability value,
    compare the entitlement probability value to a predetermined probability threshold, and
    cause the entitlement to either included in or excluded from an access review based on whether the entitlement probability value is less than or greater than the probability threshold.

2. The system of claim 1, wherein:
the affinity value is the product of the specificity value and the sensitivity value.

3. The system of claim 2, wherein:
obtaining the entitlement probability value comprises obtaining a weighted partial probability value; and
the weighted partial probability value is based on the affinity value and the partial probability value.

4. The system of claim 3, wherein:
the weighted partial probability value is the product of the affinity value and the partial probability value.

5. The system of claim 4, wherein:
the attribute is one of a set of attributes associated with the user;
the affinity value is one of a plurality of affinity values obtained for each attribute in the set of attributes;
the weighted partial probability is one of a plurality of weighted partial probabilities obtained for each attribute in the set of attributes; and
the probability determination module obtains the entitlement probability value with the equation where P(X, E) is the entitlement probability value for the entitlement, E, with respect to the set of attributes, X, where $A(R_i, E)$ is an affinity value for one of the attributes, $R_i$, in the set of attributes with respect to the entitlement, and where $p(R_{iv})$ is a partial probability value for an attribute value one of the attributes in the set of attributes.

6. The system of claim 1, wherein:
the predetermined probability threshold is between 0.6-0.9.

7. The system of claim 1, wherein:
the entitlement is one of a plurality of entitlements associated with the user;
the entitlement probability value is one of a plurality of entitlement probability values respectively obtained for the plurality of entitlements; and
the instructions, when executed by one of the processors, further cause the system to provide the plurality of entitlement probability values to an access review system, and
receipt of the plurality of entitlement probability values at the access review system causes the access review system to configure an access review list based on the plurality of entitlement probability values.

8. The system of claim 1, wherein:
the set of attributes includes a job code of the user, a geographic location of the user, and a manager of the user.

9. The system of claim 1 wherein:
the access review comprises a list of entitlements associated with the user; and
the list of entitlements comprises a first section associated with a first entitlement probability wherein the first section identifies a first computing resource the user is entitled to access and a second section associated with a second entitlement probability that is greater than the first entitlement probability wherein the second section identifies a second computing resource the user is entitled to access.

10. The system of claim 9 wherein:
the list of entitlements arranges the first section and second section in ascending order of entitlement probability.

11. A system for predicting entitlements to computing resources, the system comprising:
one or more processors;
a first database storing attribute information identifying one or more attributes associated with one or more users of the computing system;
a second database storing entitlement information identifying, for one or more of the users, one or more entitlements wherein each entitlement indicates one of one or more computing resources of the computer system that is accessible to one of the users; and
memory storing instructions that, when executed by one of the processors, cause the system to
(a) obtain a specificity value for one of the attributes with respect to one of the entitlements based on a total number of unique attribute values of the attribute and a total number of unique values of the attribute that are associated with at least one user having the entitlement,
(b) obtain a sensitivity value for the attribute with respect to the entitlement based on a total number of users having the entitlement across all of the unique attribute values that are associated with at least one user having the entitlement and a total number of users across all of the unique attribute values that are associated with at least one user having the entitlement,
(c) obtain an affinity value for the attribute based on the specificity value and the sensitivity value,
(d) obtain a partial probability value for an attribute value of the attribute based on a total number of users having the entitlement that are associated with the attribute value and a total number of users that are associated with the attribute value,
(e) obtain an entitlement probability value based, at least in part, on the affinity value and the partial probability value,
(f) repeat steps (a)-(e) for each one of the one or more attributes with respect to each one of the entitlements to obtain a plurality of entitlement probability values, and
(g) create a user role based on at least a portion of the plurality of entitlement probability values.

12. The system of claim 11, wherein:
creating the user role comprises
determining one of the plurality of entitlement probability values exceeds a predetermined probability threshold,
identifying which one of the one or more attributes is associated with the entitlement probability value that exceeds the predetermined probability threshold, and
associating that attribute with the user role, and
associating the entitlement corresponding to the entitlement probability value with the user role.

13. The system of claim 12, wherein:
the predetermined probability threshold is between 0.90-0.99.

14. The system of claim of claim 12, wherein:
the instructions, when executed by one of the processors, further cause the system to
(h) determine that an attribute of a user matches the attribute associated with the user role, and
(i) assign the user role to the user such that the user receives the entitlement associated with the user role.

15. The system of claim 14, wherein:
a plurality of attributes are associated with the user role; and
a plurality of attributes of the user respectively match the plurality of the attributes associated with the user role.

16. The system of claim 12, wherein:
creating the user role further comprises
identifying another entitlement that depends on the entitlement associated with the user role, and
associating the other entitlement with the user role.

17. A computer-implemented method for predicting entitlements to computing resources, the method comprising:
(a) obtaining a specificity value for one of the attributes with respect to one of the entitlements based on a total number of unique attribute values of the attribute and a total number of unique values of the attribute that are associated with at least one user having the entitlement,
(b) obtaining a sensitivity value for the attribute with respect to the entitlement based on a total number of users having the entitlement across all of the unique attribute values that are associated with at least one user having the entitlement and a total number of users across all of the unique attribute values that are associated with at least one user having the entitlement,
(c) obtaining an affinity value for the attribute based on the specificity value and the sensitivity value, (d) obtaining a partial probability value for an attribute value of the attribute based on a total number of users having the entitlement that are associated with the attribute value and a total number of users that are associated with the attribute value,
(e) obtaining an entitlement probability value based, at least in part, on the affinity value and the partial probability value,
(f) repeating steps (a)-(e) for each one of the one or more attributes with respect to each one of the entitlements to obtain a plurality of entitlement probability values, and
(g) creating a user role based on at least a portion of the plurality of entitlement probability values.

18. The method of claim 17, wherein:
creating the user role comprises
  determining one of the plurality of entitlement probability values exceeds a predetermined probability threshold,
  identifying which one of the one or more attributes is associated with the entitlement probability value that exceeds the predetermined probability threshold, and
  associating that attribute with the user role, and
  associating the entitlement corresponding to the entitlement probability value with the user role.

19. The method of claim 18, wherein:
creating the user role further comprises
  identifying another entitlement that depends on the entitlement associated with the user role, and
  associating the other entitlement with the user role.

20. The method of claim 17, further comprising:
(h) determining that an attribute of a user matches the attribute associated with the user role, and
(i) assigning the user role to the user such that the user receives the entitlement associated with the user role.

* * * * *